(12) United States Patent
Saito

(10) Patent No.: US 7,215,668 B2
(45) Date of Patent: May 8, 2007

(54) METHOD AND APPARATUS FOR PROCESSING INFORMATION, STORAGE MEDIUM, AND SOFTWARE PROGRAM

(75) Inventor: Shin Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1035 days.

(21) Appl. No.: 10/044,110

(22) Filed: Jan. 10, 2002

(65) Prior Publication Data

US 2002/0105956 A1 Aug. 8, 2002

(30) Foreign Application Priority Data

Jan. 15, 2001 (JP) ............................ P2001-006758

(51) Int. Cl.
*H04L 12/28* (2006.01)
*H04Q 7/24* (2006.01)
*H04J 3/24* (2006.01)

(52) U.S. Cl. ..................... 370/392; 370/338; 370/349

(58) Field of Classification Search ................ 370/389, 370/392, 401, 338, 349; 455/411, 432.1, 455/436, 444

See application file for complete search history.

(56) References Cited

U.S. PATENT DOCUMENTS

| 6,594,776 | B1 * | 7/2003 | Karighattam et al. .......... 714/4 |
| 6,895,007 | B1 * | 5/2005 | Teraoka ....................... 370/392 |
| 6,904,466 | B1 * | 6/2005 | Ishiyama et al. ........... 709/245 |
| 6,959,009 | B2 * | 10/2005 | Asokan et al. .............. 370/475 |
| 2002/0099856 | A1 * | 7/2002 | Shitama ....................... 709/249 |
| 2002/0126642 | A1 * | 9/2002 | Shitama ....................... 370/338 |

* cited by examiner

*Primary Examiner*—Wing Chan
*Assistant Examiner*—Warner Wong
(74) *Attorney, Agent, or Firm*—Sonnenschein Nath & Rosenthal LLP

(57) ABSTRACT

A terminal acquires a network prefix of a network connected thereto, and determines whether that network prefix is identical to an initial network prefix. When the terminal determines that the two prefixes are different, the terminal reads the network prefix of each of a destination address and a source address in a received packet. When the read network prefix is different from the initial network prefix, the terminal substitutes the initial network prefix for the read network prefix, thereby generating a pseudo header. The terminal authenticates the received packet using the generated pseudo header.

23 Claims, 12 Drawing Sheets

FIG. 11

| SOURCE IP ADDRESS | | |
|---|---|---|
| DESTINATION IP ADDRESS | | |
| ZERO | PORT | TCP/UDP LENGTH |

METHOD AND APPARATUS FOR PROCESSING INFORMATION, STORAGE MEDIUM, AND SOFTWARE PROGRAM

RELATED APPLICATION DATA

The present application claims priority to Japanese Application(s) No(s). P2001-006758 filed Jan. 15, 2001, which application(s) is/are incorporated herein by reference to the extent permitted by law.

BACKGROUND OF THE INVENTION

1. Field of the Invention

The present invention relates to a method and apparatus for processing information, a storage medium and a software program and, more particularly, to a method and apparatus for processing information, a storage medium and a software program for assuring movement transparency at an upper layer without modifying an existing protocol.

2. Description of the Related Art

As mobile computers become ubiquitous, users frequently carry computers with them. The user not only carries a mobile computer, but also connects the computer to a network at a destination of the user to receive a variety of services through the network.

In today's mobile computing environment, a node, i.e., a device (a computer) to receive service through a network, is required to be mobile. Such a node, if moved in the location thereof, must continuously remain communicable.

Based on the IP V6 (Internet Protocol Version 6), Mobile IP V6 has been proposed as a protocol to assure movement transparency at the network layer by IETF (the Internet Engineering Task Force). Japanese Patent Application No. 2000-000560, assigned to the assignee of this invention, also discloses a technique (hereinafter referred to as VIP V6) based on the IP V6.

In accordance with the technique disclosed in Japanese Patent Application No. 2000-000560, the least significant 64 bits of an IP V6 address are set to be unique to assure movement transparency at the IP layer.

Movement transparency cannot be assured in a session at an IPsec (Security Architecture for Internet Protocol) layer or an upper layer (TCP/UDP (User Datagram Protocol)) without modification in an existing protocol.

A technique is contemplated to assign a predetermine fixed value to a network prefix, which is the most significant 64 bits of the IP V6 address. In this case, however, standardization is must be achieved to use a particular fixed network prefix to the VIP V6 protocol in accordance with the foregoing Patent Application No. 2000-000560.

Upon receiving a packet, a receiver node needs to determine whether to perform a session at the Ipsec layer or the upper layer (TCP/UDP) or an ordinary session using a source address contained in the received packet. To this end, the receiver node describes an ID (Identification) identifying a node in the least significant 64 bits of the IP V6 address, or indicates a "fixed value+node identification ID" to a domain name server to check whether the address is registered.

In this arrangement, however, at least one network prefix is dedicated to a session at the Ipsec layer or the upper layer. The address is thus consumed in vain.

SUMMARY OF THE INVENTION

Accordingly, it is an object of the present invention to assure movement transparency at an Ipsec layer or a transport layer without the need for modifying an existing protocol.

The present invention in a first aspect relates to an apparatus for processing information, connected to a partner information processing apparatus through a network, and includes a storage unit for storing first position information representing an initial position of the information processing apparatus, and second position information representing an initial position of the partner information processing apparatus when communication is established with the partner information processing apparatus, a receiver for receiving data from the partner information processing apparatus, an acquisition unit for acquiring third position information representing a current position of the information processing apparatus, a first determining unit for determining whether the third position information acquired by the acquisition unit corresponds to the first position information stored in the storage unit, and an authenticator for authenticating the data received by the receiver, based on a result of determination provided by the first determining unit.

The apparatus preferably further includes a reader unit for reading fourth position information of the information processing apparatus, forming a destination address, and fifth position information of the partner information processing apparatus, forming a source address, contained in the data received by the receiver unit, when the result of determination provided by the first determining unit indicates that the third position information fails to correspond to the first position information, and a second determining unit for determining whether the fifth position information read by the reader unit corresponds to the second position information stored in the storage unit.

The apparatus preferably further includes a substituting unit for substituting the first position information for the fourth position information when the result of determination provided by the first determining unit indicates that the third position information fails to correspond to the first position information.

The apparatus preferably further includes a substituting unit for substituting the second position information for the fifth position information when the result of determination provided by the second determining unit indicates that the fifth position information fails to correspond to the second position information.

The fourth position information is preferably assigned to a portion of the most significant bits of the destination address.

The fifth position information is preferably assigned to a portion of the most significant bits of the source address.

The authenticator preferably uses the first and second position information to authenticate the data received by the receiver.

The apparatus preferably further includes a notifying unit for notifying an information storage device connected to the network of the fourth position information representing the current position of the information processing apparatus, and identification information identifying the information processing apparatus, when the information processing apparatus is connected to another network.

The identification information is preferably a terminal identifier identifying the information processing apparatus over the network.

The apparatus preferably includes a reset unit for resetting the first and second position information stored in the storage unit when communication with the partner information processing apparatus is disconnected.

The present invention in a second aspect relates to a method for processing information for an information processing apparatus that is connected to a partner information processing apparatus through a network, and includes a step of controlling storage of first position information representing an initial position of the information processing apparatus, and of second position information representing an initial position of the partner information processing apparatus when communication is established with the partner information processing apparatus, a step of receiving data from the partner information processing apparatus, a step of acquiring third position information representing a current position of the information processing apparatus, a step of determining whether the third position information acquired in the acquisition step corresponds to the first position information, storage of which is controlled in the controlling step, and a step of authenticating the data received in the receiving step, based on a result of determination provided in the determining step.

The present invention in a third aspect relates to a storage medium storing a computer-readable software program for controlling an information processing apparatus that is connected to a partner information processing apparatus through a network. The software program includes program codes for a step of controlling storage of first position information representing an initial position of the information processing apparatus, and of second position information representing an initial position of the partner information processing apparatus when communication is established with the partner information processing apparatus, a step of receiving data from the partner information processing apparatus, a step of acquiring third position information representing a current position of the information processing apparatus, a step of determining whether the third position information acquired in the acquisition step corresponds to the first position information, storage of which is controlled in the controlling step, and a step of authenticating the data received in the receiving step, based on a result of determination provided in the determining step.

The present invention in a fourth aspect relates to a software program executed by a computer that is connected to a partner information processing apparatus through a network, and includes a step of controlling storage of first position information representing an initial position of the information processing apparatus, and of second position information representing an initial position of the partner information processing apparatus when communication is established with the partner information processing apparatus, a step of receiving data from the partner information processing apparatus, a step of acquiring third position information representing a current position of the information processing apparatus, a step of determining whether the third position information acquired in the acquisition step corresponds to the first position information, storage of which is controlled in the controlling step, and a step of authenticating the data received in the receiving step, based on a result of determination provided in the determining step.

In accordance with the first through fourth aspects of the present invention, the first position information representing the initial position of the information processing apparatus, and the second position information representing the initial position of the partner information processing apparatus are stored when communication is established with the partner information processing apparatus. The data is received from the partner information processing apparatus. The third position information representing the current position of the information processing apparatus is acquired. It is determined whether the third acquired position information corresponds to the first position information. The received data is then authenticated based on the result of determination.

The present invention in a fifth aspect relates to an apparatus for processing information, connected to a partner information processing apparatus through a network, and includes a storage unit for storing first position information representing an initial position of the information processing apparatus, and second position information representing an initial position of the partner information processing apparatus when communication is established with the partner information processing apparatus, a first acquisition unit for acquiring third position information representing a current position of the information processing apparatus, a first determining unit for determining whether the third position information acquired by the first acquisition unit corresponds to the first position information stored in the storage unit, a second acquisition unit for acquiring fourth position information representing a current position of the partner information processing apparatus, a second determining unit for determining whether the fourth position information acquired by the second acquisition unit corresponds to the second position information stored in the storage unit, and a transmitter for transmitting data to the partner information processing apparatus, based on results of determination provided by the first and second determining unit.

The apparatus preferably further includes a substituting unit for substituting the first position information for the third position information when the result of determination provided by the first determining unit indicates that the third position information fails to correspond to the first position information.

The apparatus preferably further includes a substituting unit for substituting the second position information for the fourth position information when the result of determination provided by the second determining unit indicates that the fourth position information fails to correspond to the second position information.

The apparatus preferably further includes a calculating unit for calculating additional information, to be added to the data, from the first and second position information stored in the storage unit, and an adding unit for adding the additional information calculated by the calculating unit to the data, wherein the transmitter sets, at a source address, the third position information acquired by the first acquisition unit, sets, at a destination address, the fourth position information acquired by the second acquisition unit, and transmits the data to which the additional data has been added by the adding unit.

The third position information is preferably assigned to a portion of the most significant bits of the destination address.

The fourth position information is preferably assigned to a portion of the most significant bits of the source address.

The apparatus preferably further includes a notifying unit for notifying an information storage device connected to the network of the fifth position information representing the current position of the information processing apparatus, and identification information identifying the information processing apparatus, when the information processing apparatus is connected to another network.

The identification information is preferably a terminal identifier identifying the information processing apparatus over the network.

The apparatus preferably further includes a reset unit for resetting the first and second position information stored in the storage unit when communication with the partner information processing apparatus is disconnected.

The present invention in a sixth aspect relates to a method for processing information, for an information processing apparatus connected to a partner information processing apparatus through a network, and includes a step of controlling storage of first position information representing an initial position of the information processing apparatus, and of second position information representing an initial position of the partner information processing apparatus when communication is established with the partner information processing apparatus, a first acquisition step of acquiring third position information representing a current position of the information processing apparatus, a first determining step of determining whether the third position information acquired in the first acquisition step corresponds to the first position information, storage of which is controlled in the controlling step, a second acquisition step of acquiring fourth position information representing a current position of the partner information processing apparatus, a second determining step of determining whether the fourth position information acquired in the second acquisition step corresponds to the second position information, storage of which is controlled in the controlling step, and a transmitting step of transmitting data to the partner information processing apparatus, based on results of determination provided in the first and second determining steps.

The present invention in a seventh aspect relates to a storage medium storing a computer-readable software program for controlling an information processing apparatus connected to a partner information processing apparatus through a network, and the computer-readable software program includes program codes for a step of controlling storage of first position information representing an initial position of the information processing apparatus, and of second position information representing an initial position of the partner information processing apparatus when communication is established with the partner information processing apparatus, a first acquisition step of acquiring third position information representing a current position of the information processing apparatus, a first determining step of determining whether the third position information acquired in the first acquisition step corresponds to the first position information, storage of which is controlled in the controlling step, a second acquisition step of acquiring fourth position information representing a current position of the partner information processing apparatus, a second determining step of determining whether the fourth position information acquired in the second acquisition step corresponds to the second position information, storage of which is controlled in the controlling step, and a transmitting step of transmitting data to the partner information processing apparatus, based on results of determination provided in the first and second determining steps.

The present invention in an eighth aspect relates to a software program executed by a computer connected to a partner information processing apparatus through a network, and the software program includes program codes for a step of controlling storage of first position information representing an initial position of the information processing apparatus, and of second position information representing an initial position of the partner information processing apparatus when communication is established with the partner information processing apparatus, a first acquisition step of acquiring third position information representing a current position of the information processing apparatus, a first determining step of determining whether the third position information acquired in the first acquisition step corresponds to the first position information, storage of which is controlled in the controlling step, a second acquisition step of acquiring fourth position information representing a current position of the partner information processing apparatus, a second determining step of determining whether the fourth position information acquired in the second acquisition step corresponds to the second position information, storage of which is controlled in the controlling step, and a transmitting step of transmitting data to the partner information processing apparatus, based on results of determination provided in the first and second determining steps.

In accordance with the fifth through eighth aspects of the present invention, the first position information representing the initial position of the information processing apparatus, and the second position information representing the initial position of the partner information processing apparatus are stored when communication is established with the partner information processing apparatus. The third position information representing the current position of the information processing apparatus is acquired. It is determined whether the third acquired position information corresponds to the first position information. The fourth position information representing the current position of the partner information processing apparatus is acquired. It is determined whether the fourth acquired position information corresponds to the second position information. Data is then transmitted to the partner information processing apparatus, based on these results of determination.

BRIEF DESCRIPTION OF THE DRAWINGS

FIG. 11 illustrates a format of a pseudo header; and

DESCRIPTION OF THE PREFERRED EMBODIMENTS

Figure 1:
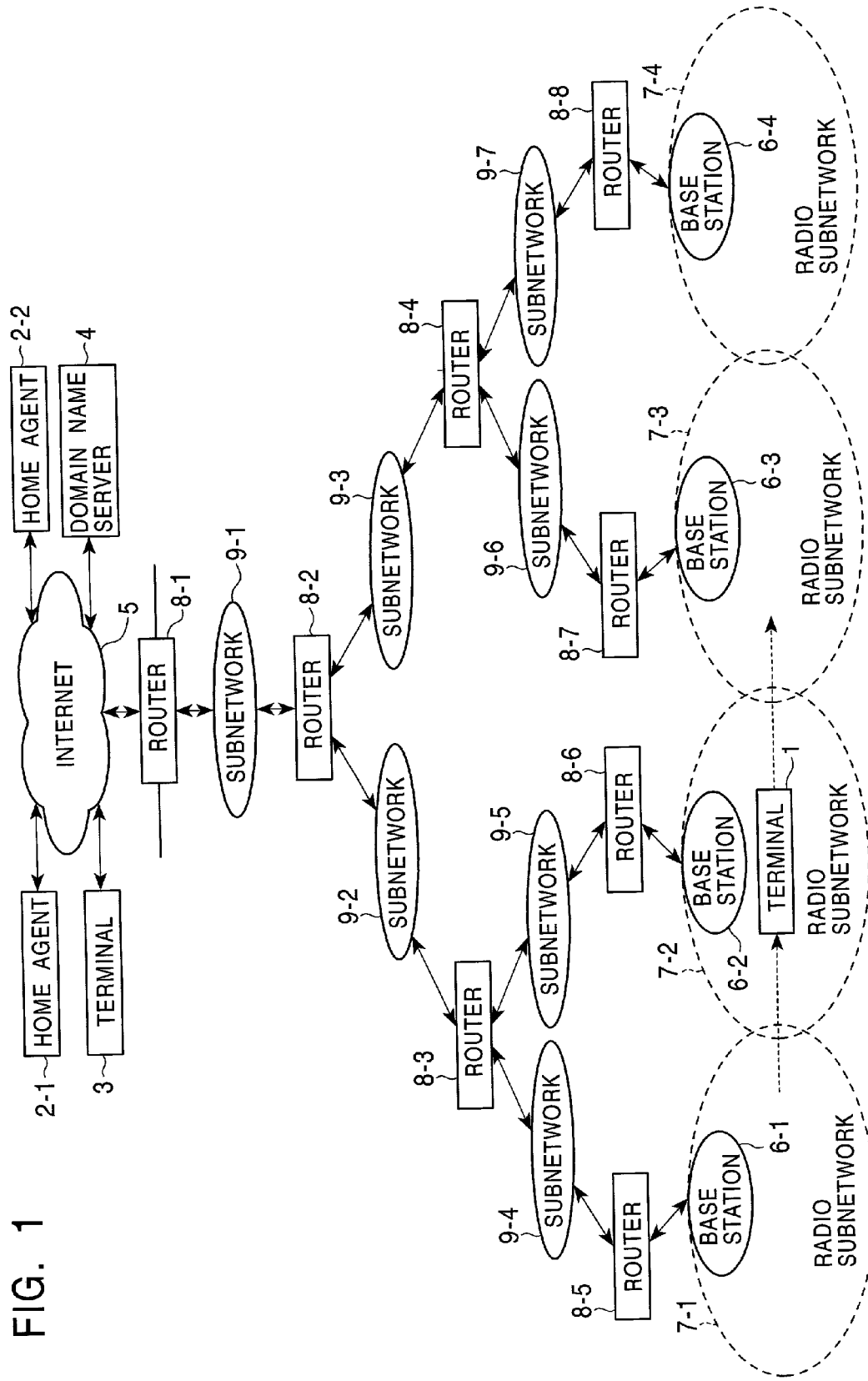
FIG. 1 shows a network system in accordance with one embodiment of the present invention.

FIG. 1 shows a network system in accordance with one embodiment of the present invention. In the network system, nodes, such as a terminal 1 and a terminal 3, forming the network, perform communication based on the IP V6 address.

Figure 2:
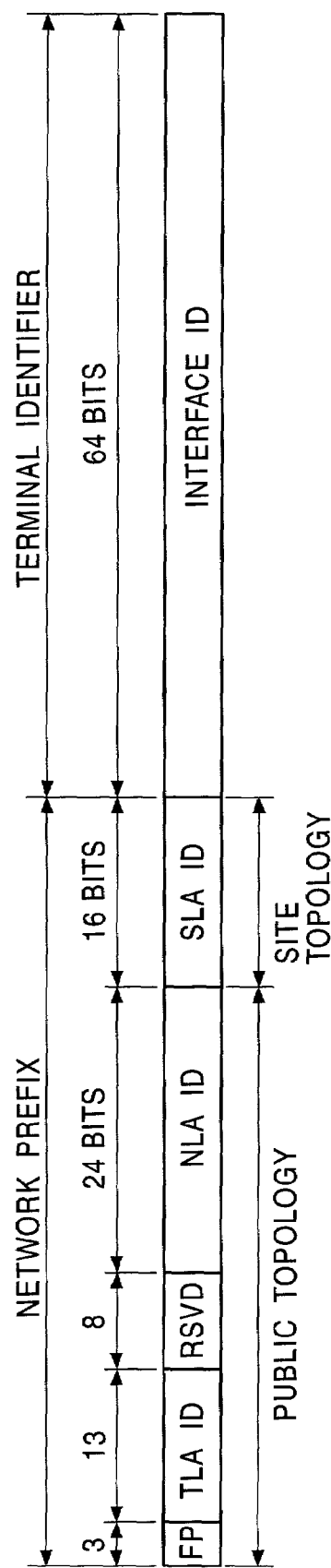
FIG. 2 shows a format structure of an IP V6 address.

The IP V6 address is constructed of 128 bits as shown in FIG. 2. The most significant 64 bits of the IP V6 address are referred to as a network prefix, and the least significant 64 bits thereof are referred to as a terminal identifier (Interface ID).

The network prefix includes an FP (Format Prefix) of 3 bits, a TLA ID (Top Level Aggregation Identifier) of 13 bits, an rsvd (Reserved) of 8 bits, an NLA ID (Next Level Aggregation Identifier) of 24 bits, and an SLA ID (Site Level Aggregation Identifier) of 16 bits. Of the network prefix, the FP, the TLA ID, the rsvd, and the NLA ID are called public topology, while the SLA ID is called site topology.

The network prefix indicates a subnetwork to which a node is connected (for example, any of subnetworks 9-1 through 9-7 and radio subnetworks 7-1 through 7-4 shown in FIG. 1), and is used to send a packet to the node.

The terminal identifier uniquely identifies a respective node such as one of the terminal 1 and the terminal 3 over the Internet 5, and remains unchanged in value regardless of the location and the movement of the location of the node. The terminal identifier is used to recognize or authenticate the node.

Figure 3:
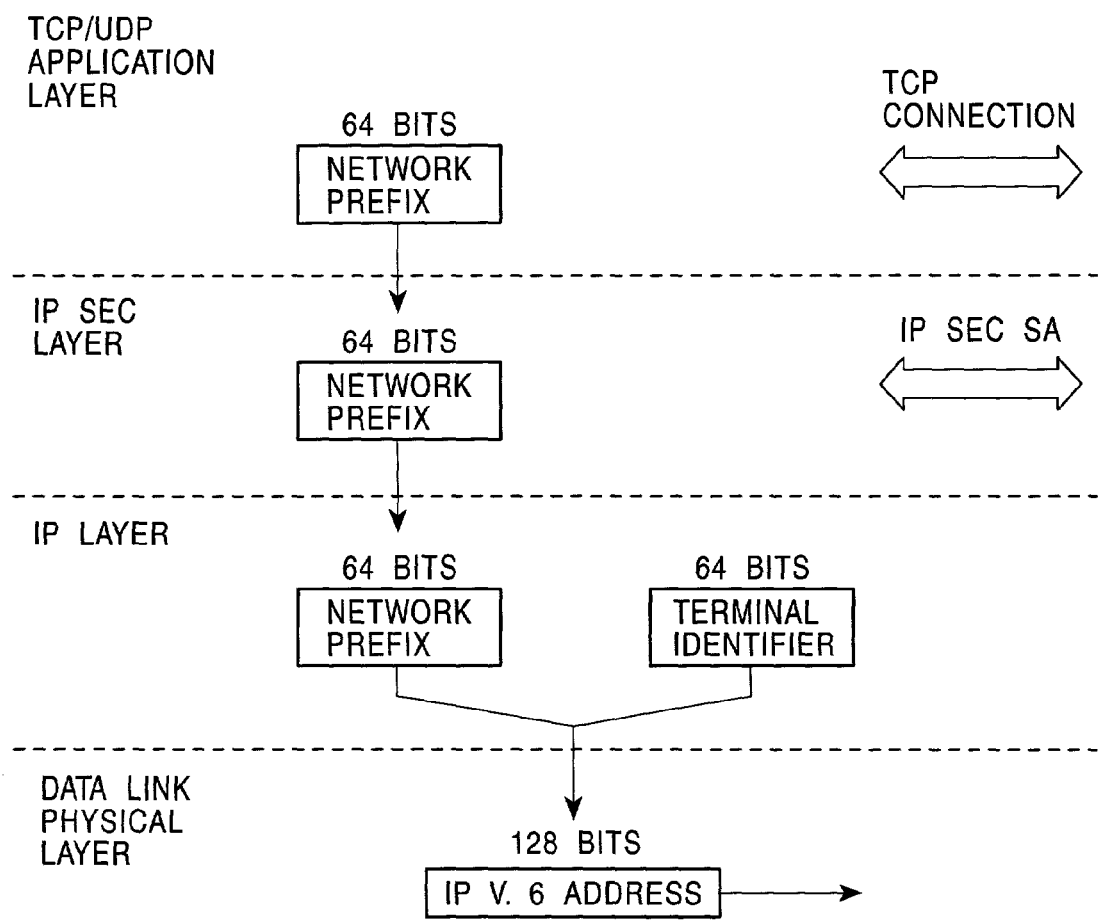
FIG. 3 shows a protocol layer in the IP V6.

FIG. 3 shows the construction of a protocol layer structure of the IP V6 of the present invention. The protocol layer structure of the IP V6 is constructed of an application layer, a TCP/UDP layer, an IPsec layer, an IP layer, a data link layer, and a physical layer.

Returning to FIG. 1, the terminal 1, which is mobile and portable, is placed within a radio subnetwork 7-1 of a base station 6-1, and communicates with the base station 6-1 by radio. The terminal 1 is thus linked with the Internet 5 via a router 8-5, a subnetwork 9-4, a router 8-3, a subnetwork 9-2, a router 8-2, a subnetwork 9-1, and a router 8-1.

When the terminal 1, placed within a radio subnetwork 7-2 of a base station 6-2, communicates with the base station 6-2 by radio, the terminal 1 is linked with the Internet 5 via a router 8-6, a subnetwork 9-5, the router 8-3, the subnetwork 9-2, the router 8-2, the subnetwork 9-1, and the router 8-1.

When the terminal 1, placed within a radio subnetwork 7-3 of a base station 6-3, communicates with the base station 6-3 by radio, the terminal 1 is linked with the Internet 5 via a router 8-7, a subnetwork 9-6, a router 8-4, a subnetwork 9-3, the router 8-2, the subnetwork 9-1, and the router 8-1.

When the terminal 1, placed within a radio subnetwork 7-4 of a base station 6-4, communicates with the base station 6-4 by radio, the terminal 1 is thus linked with the Internet 5 via a router 8-8, a subnetwork 9-7, the router 8-4, the subnetwork 9-3, the router 8-2, the subnetwork 9-1, and the router 8-1.

A home agent 2-1 stores a correspondence between the terminal identifier of the terminal 1 and the network prefix. A home agent 2-2 also stores the correspondence between the terminal identifier of the terminal 1 and the network prefix.

The terminal 3, connected to the Internet 5, communicates with the terminal 1 through the Internet 5, etc.

A domain name server 4 stores, by a host name of each terminal, a terminal identifier of the terminal and an IP V6 address of a mapping agent (discussed later with reference to FIG. 6) associated with the terminal.

The base station 6-1 forms the radio subnetwork 7-1, and communicates by radio with the terminal 1, which is present within the area of the radio subnetwork 7-1. The base station 6-1 receives a packet sent from the terminal 1, and supplies the received packet to the router 8-5, while transferring a packet, addressed to the terminal 1 and received from the router 8-5, to the terminal 1.

The base station 6-1 supplies the terminal 1, placed within the radio subnetwork 7-1, with the network prefix corresponding to the radio subnetwork 7-1.

The base station 6-2 forms the radio subnetwork 7-2, and communicates by radio with the terminal 1 present within the area of the radio subnetwork 7-2. The base station 6-2 receives a packet sent from the terminal 1 and supplies the received packet to the router 8-6, while transferring a packet, addressed to the terminal 1 and received from the router 8-6, to the terminal 1.

The base station 6-2 supplies the terminal 1, placed within the radio subnetwork 7-2, with a network prefix corresponding to the radio subnetwork 7-2.

The base station 6-3 forms the radio subnetwork 7-3, and communicates by radio with the terminal 1 present within the area of the radio subnetwork 7-3. The base station 6-3 receives a packet sent from the terminal 1 and supplies the received packet to the router 8-7, while transferring a packet, addressed to the terminal 1 and received from the router 8-7, to the terminal 1.

The base station 6-3 supplies the terminal 1, placed within the radio subnetwork 7-3, with a network prefix corresponding to the radio subnetwork 7-3.

The base station 6-4 forms the radio subnetwork 7-4, and communicates by radio with the terminal 1 present within the area of the radio subnetwork 7-4. The base station 6-4 receives a packet sent from the terminal 1 and supplies the received packet to the router 8-8, while transferring a packet, addressed to the terminal 1 and received from the router 8-8, to the terminal 1.

The base station 6-4 supplies the terminal 1, placed within the radio subnetwork 7-4, with a network prefix corresponding to the radio subnetwork 7-4.

Each of the base station 6-1 through the base station 6-4 communicates with a plurality of terminals, and each of the radio subnetwork 7-1 through the radio subnetwork 7-4 constitutes a subnetwork by radio.

The router 8-1 through the router 8-8 each store a network prefix with each terminal associated therewith, and control a path (for routing) of a packet supplied from one of the terminal 1, the terminal 3, the home agents 2-1 and 2-2, and the domain name server 4.

When there is no need for discriminating between the home agents 2-1 and 2-2 in the following discussion, the phrase home agent 2 will be representatively used. When there is no need for discriminating the base stations 6-1 through 6-4 from one another, the phrase base station 6 will be representatively used. When there is no need for discriminating the radio subnetworks 7-1 through 7-4 from one another, the phrase radio subnetwork 7 will be representatively used. When there is no need for discriminating the routers 8-1 through 8-8 from one another, the phrase router 8 will be representatively used. When there is no need for discriminating the subnetworks 9-1 through 9-7 from one another, the phrase subnetwork 9 will be representatively used.

Figure 4:
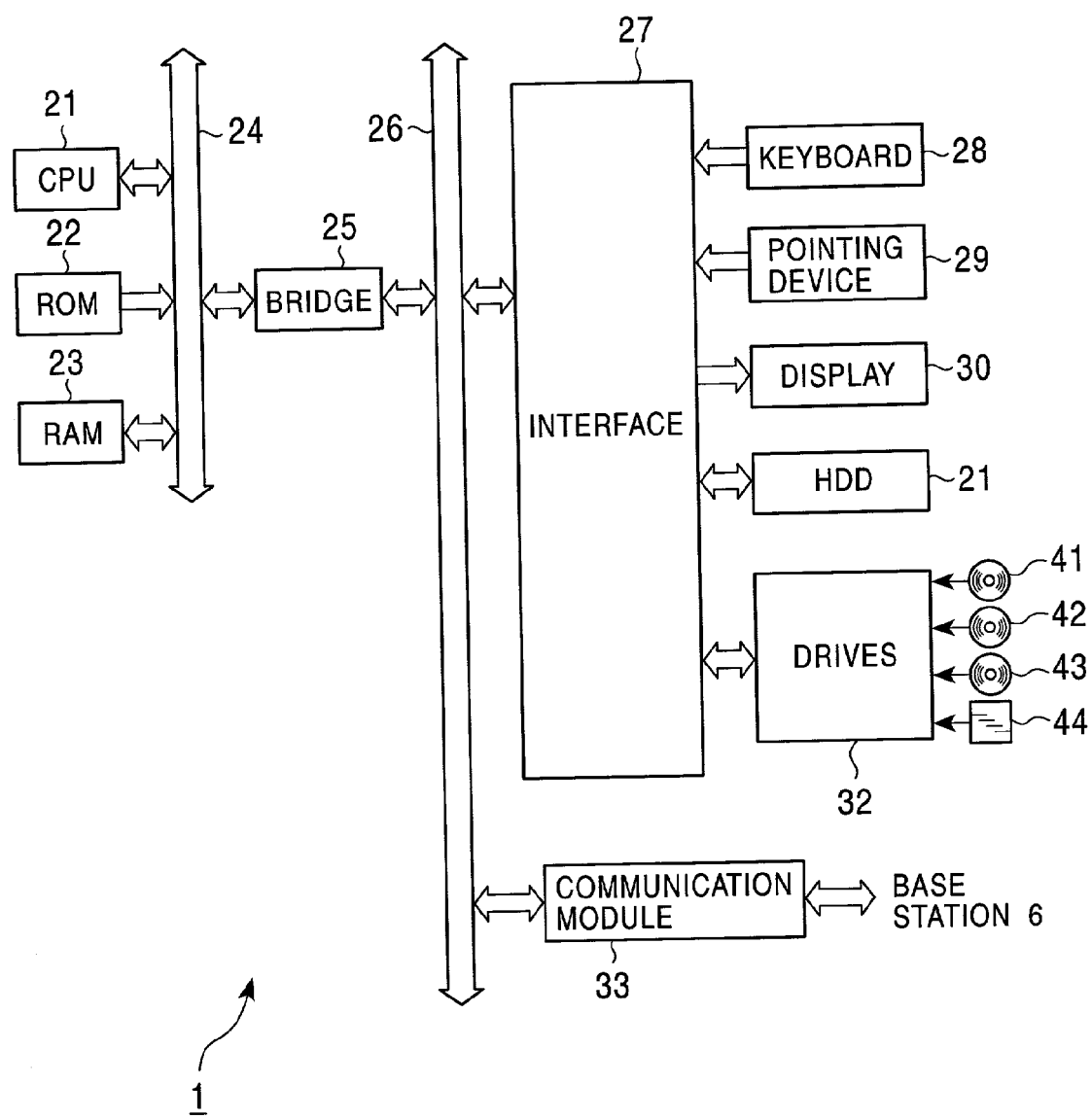
FIG. 4 is a block diagram showing the construction of a terminal shown in FIG. 1.

FIG. 4 is a block diagram showing the construction of the terminal 1.

A CPU (Central Processing Unit) 21 executes a variety of application programs and an OS (Operating System). A ROM (Read-Only Memory) 22 typically stores programs performed by the CPU 21 and parameters for calculation having fixed value and used in calculation. A RAM (Random-Access Memory) 23 stores programs performed by the CPU 21 and parameters that variable in operation. These components are mutually connected via a host bus 24 including a CPU bus.

The host bus 24 is connected to an external bus 26 such as a PCI (Peripheral Component Interconnect/Interface) bus via a bridge 25.

The user operates a keyboard 28 to input a variety of commands to the CPU 21. The user operates a pointing device 29 to point to or select a location on a screen of a display 30. The display 30, constructed of a liquid-crystal display, for example, displays various pieces of information in text or image. A hard disk drive 31 drives a hard disk, recording or reproducing the program, executed by the CPU 21, or information.

The drive 32 reads data or programs (including a program to be executed by a communication module 33) stored in one of a magnetic disk 41, an optical disk 42, a magneto-optical disk 43, and a semiconductor memory 44, and then supplies the RAM 23 or the communication module 33 with the data or the programs through an interface 27, the external bus 26, the bridge 25, and the host bus 24. Components from the keyboard 28 through the drive 32 are connected to the interface 27, which in turn is connected to the CPU 21 through the external bus 26, the bridge 25, and the host bus 24.

The communication module 33 communicates with the base station 6, organizes the data supplied from the CPU 21, or the hard disk drive 31 into a packet in a predetermined format, and transmits the packet to the base station 6. The communication module 33 outputs data, organized in a packet received from the base station 6, to the CPU 21, the RAM 23, or the hard disk drive 31.

The communication module 33 is connected to the CPU 21 through the external bus 26, the bridge 25, and the host bus 24.

Since each of the home agents 2-1 and 2-2, the terminal 3, and the domain name server 4 has the same construction as that of the terminal 1, the discussion thereof is omitted.

Figure 5:
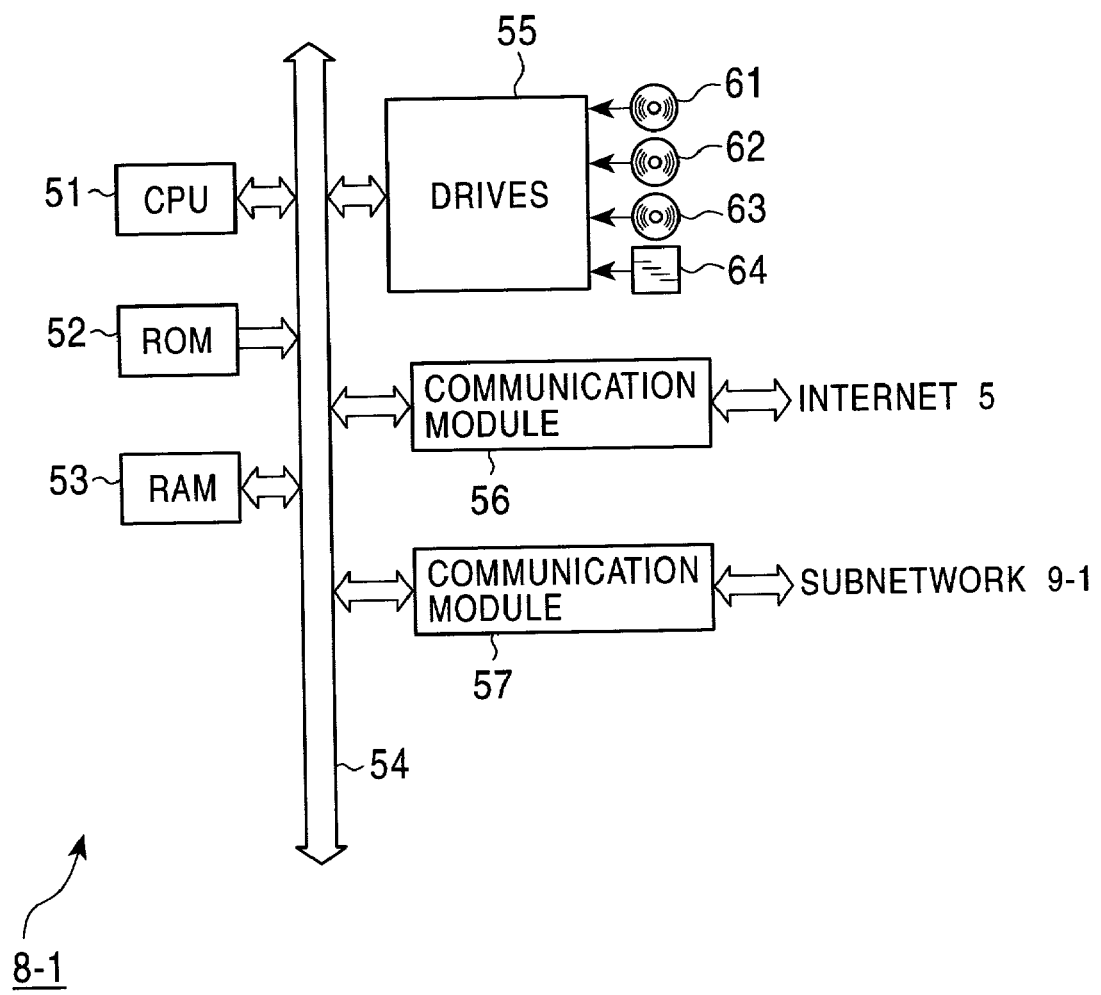
FIG. 5 is a block diagram showing the construction of a router shown in FIG. 1.

FIG. 5 is a block diagram showing the construction of the router 8-1.

A CPU 51 executes a predetermined program. An ROM 52 stores programs executed by the CPU 51 and parameters that are essentially constant. An RAM 53 stores programs executed by the CPU 51, and parameters that are variable in operation.

A drive 55 reads data or programs (including a program executed by a communication module 56 or a communication module 57) from one of a magnetic disk 61, an optical disk 62, a magneto-optical disk 63, and a semiconductor memory 64, and supplies the RAM 53, the communication module 56, or the communication module 57, each connected thereto, with the data or the program via the bus 54.

The communication module 56, connected to the Internet 5, organizes the data, supplied from the CPU 51 or the communication module 57, into a packet having a predetermined format, and sends the packet over the Internet 5. The communication module 56 outputs data, organized in a packet received from the Internet 5, to the CPU 51 or the communication module 57.

The communication module 57, connected to the subnetwork 9-1, organizes data, supplied from the CPU 51 or the communication module 56, into a packet having a predetermined format, and transmits the packet via the subnetwork 9-1. The communication module 57 also receives a packet from the subnetwork 9-1 and outputs data organized in the packet to the CPU 51 or the communication module 56.

Components from the CPU 51 through the communication module 57 are interconnected to each other via a bus 54.

Each of the routers 8-2 through 8-8 is identical in construction to the router 8-1, and the discussion thereof is omitted.

Figure 6:
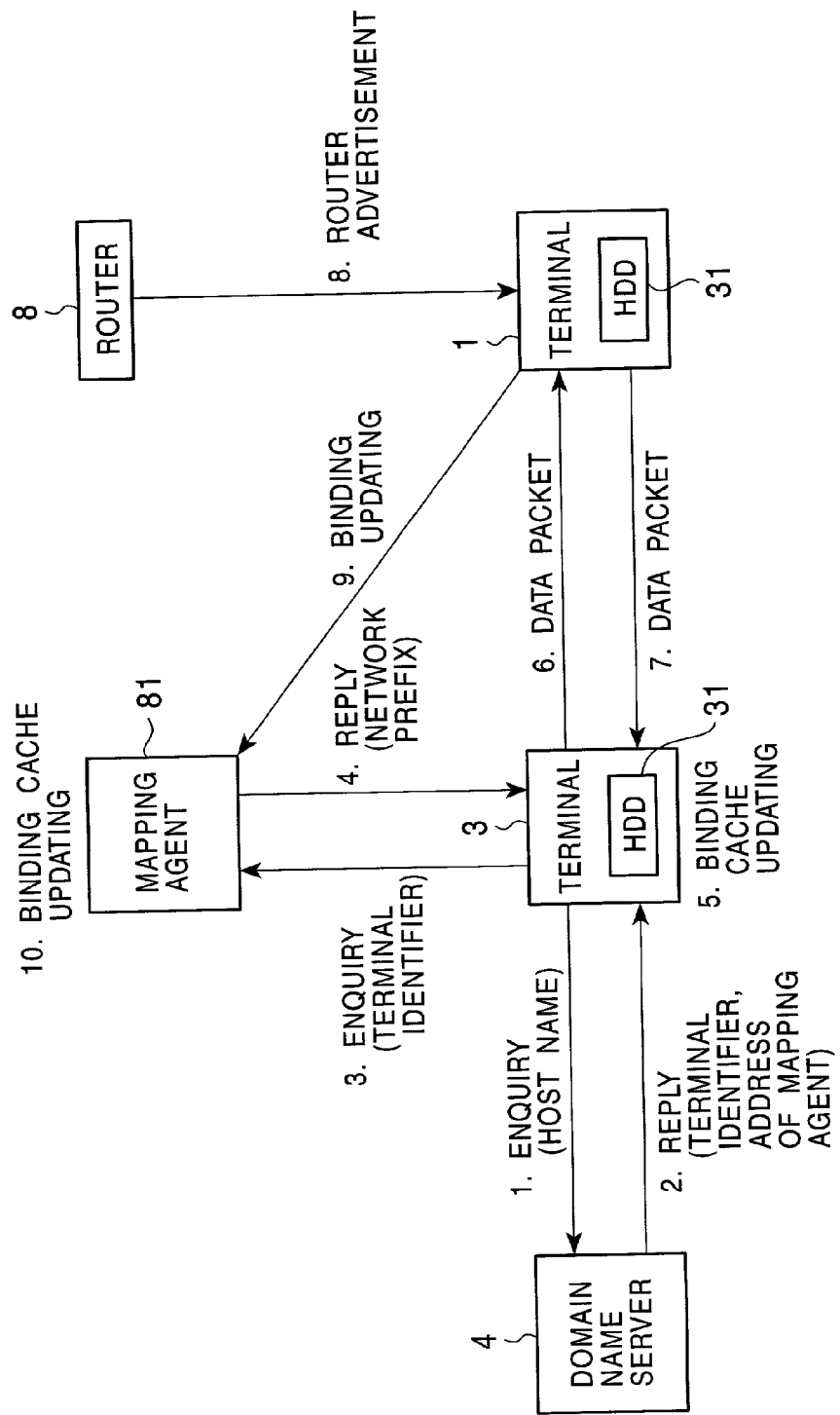
FIG. 6 illustrates the operation of a routing communication of packet data between a terminal 1 and a terminal 3.

The operation for the routing communication of packet data between the terminal 1 and the terminal 3 in accordance with this embodiment of the present invention is discussed hereinafter with reference to FIG. 6.

The terminal 3 indicates a host name of the terminal 1 to the domain name server 4 to enquire about a terminal identifier of the terminal 1 and the IP V6 address (see FIG. 2) of an mapping agent 81 (discussed in detail later) associated with the terminal 1. The domain name server 4 stores, by host name, the terminal identifier of the terminal 1 and the IP V6 address of the mapping agent 81 associated with the terminal 1. The domain name server 4 reads and sends the terminal identifier of the terminal 1 and the IP V6 address of the mapping agent 81 associated with the terminal 1 to the terminal 3.

The terminal 3 selects one IP V6 address from among IP V6 addresses corresponding to at least one mapping agent 81 received from the domain name server 4. Based on the selected IP V6 address, the terminal 3 enquires about a current network prefix of the terminal 1 to the mapping agent 81 by indicating the terminal identifier of the terminal 1 thereto.

The mapping agent 81, connected to any network, stores the current network prefix of the terminal 1 in association with the terminal identifier of the terminal 1. The mapping agent 81 thus sends the current network prefix of the terminal 1 to the terminal 3 which has enquired thereabout. The terminal 3 transfers the current network prefix of the terminal 1 received from the mapping agent 81 to a binding cache for registration or updating.

The terminal 3 combines the current network prefix of the terminal 1 with the terminal identifier, thereby generating the IP V6 address. The terminal 3 sets the generated IP V6 address at a destination address of a data packet, and sends the data packet to the terminal 1.

Since the data packet sent to the terminal 1 by the terminal 3 includes the current network prefix and the terminal identifier of the terminal 1 at the IP V6 address of the destination, the data packet reaches the terminal 1 routing through an optimal path.

The number of mapping agents 81 corresponding to the terminal 1 is more than one. Even if one mapping agent 81 malfunctions, the terminal 3 may use another mapping agent 81. The terminal 3 thus reliably communicates with the terminal 1.

The data packet transmitted to the terminal 3 by the terminal 1 includes the current network prefix and the terminal identifier of the terminal 1 set at the source and the IP V6 address of the terminal 3 set at the destination. The data packet thus reaches the terminal 3 routing through an optimal path.

When the terminal 1 has moved, the terminal 1 places an enquiry to the router 8 in a route solicitation. In this way, the terminal 1 requests the router 8 to send a router advertisement and acquires the router advertisement. The router advertisement provided by the router 8 includes a network prefix of a network that is newly connected subsequent to the movement. The terminal 1 generates a binding update packet containing the current acquired network prefix of the terminal 1 at an authentication header (see FIG. 7) and a source address, and then transmits the binding update packet to the mapping agent 81. In this way, the terminal 1 notifies the mapping agent 81 of the current network prefix of the terminal 1.

Figure 7:
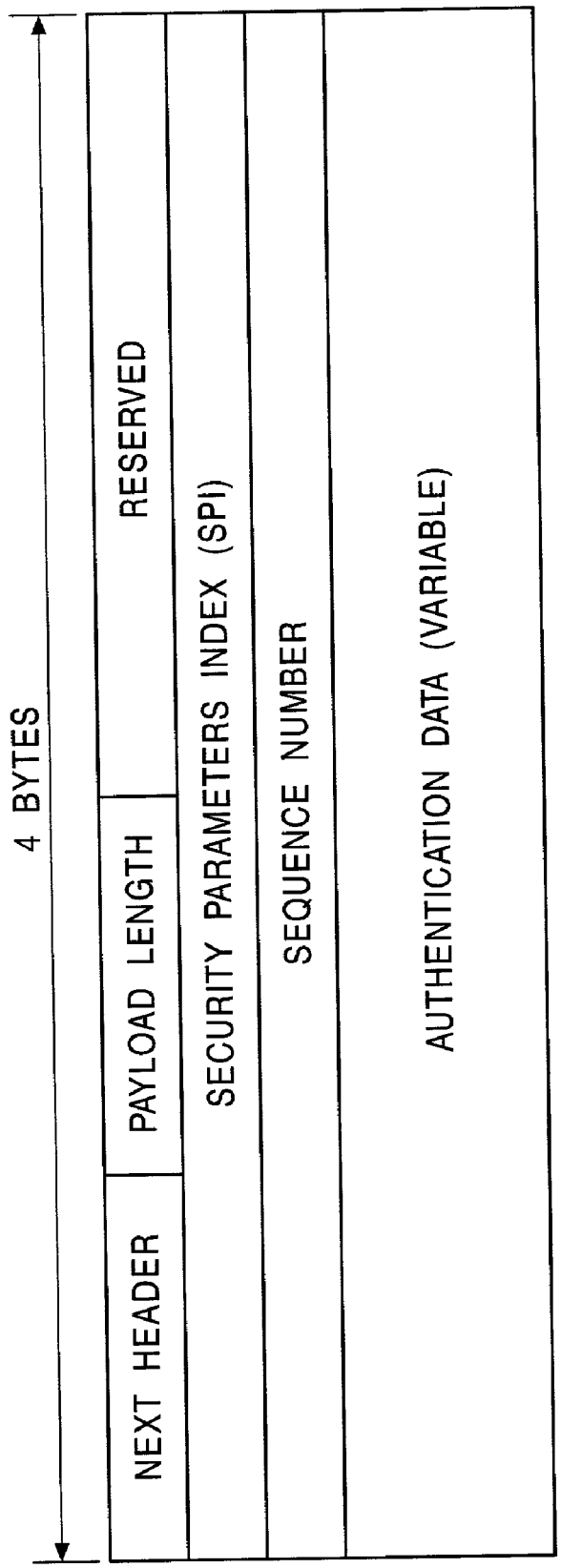
FIG. 7 shows a format of an authentication header.

Referring to FIG. 7, the authentication header having a width of 4 bytes includes an SPI (Security Parameters Index), a sequence number, authentication data, etc.

Upon receiving the binding update packet from the terminal 1, the mapping agent 81 detects an SA (Security Association) based on the terminal identifier of the source address and the authentication header, and determines a key for authentication and an encryption method, thereby performing an authentication process. When the authentication data is determined to be authentic, the mapping agent 81 transfers the current network prefix of the terminal 1 contained in the binding update packet to a binding cache for registration or updating.

An initial setting process is discussed hereinafter with reference to a flow diagram shown in FIG. 8. The initial setting process is performed between the terminal 1 and the terminal 3 when a routing communication of the packet data shown in FIG. 6 is initiated.

In step S1, the CPU 21 in the terminal 1 determines whether a connection with the terminal 3 is established. When the CPU 21 determines that the connection with the terminal 3 is not yet established, a connection process is repeated. When the CPU 21 determines that the connection between the terminal 1 and the terminal 3 is established, the process proceeds to step S2. The CPU 21 in the terminal 1 determines whether an application layer requests a transmission start or a reception start when the user operates the keyboard 28 or the pointing device 29 or when a command for the transmission start or the reception start is input.

When the CPU 21 in the terminal 1 determines in step S2 that the transmission start or the reception start is not requested, the CPU 21 waits on standby until the transmission start or the reception start is requested. When the transmission start or the reception start is requested, the process proceeds to step S3.

In step S3, the CPU 21 in the terminal 1 stores in the hard disk drive 31 a first network prefix of the terminal 1 (i.e., the most significant 64 bits of the IP V6 address of the terminal 1) and a first network prefix of the terminal 3 as a partner station acquired from the mapping agent 81 (i.e., the most significant 64 bits of the IP V6 address of the terminal 3).

In step S4, like the terminal 1, the CPU 21 in the terminal 3 stores in the hard disk drive (HDD) 31 the first network prefix of the of the terminal 3 (i.e., the most significant 64 bits of the IP V6 address of the terminal 3) and the first network prefix of the terminal 1 as a partner station acquired from the mapping agent 81 (i.e., the most significant 64 bits of the IP V6 address of the terminal 1).

Subsequent to the initial setting process, the network prefixes initially stored are used to calculate the authentication data and checksum during authentication of the IPsec, even if one or both of the terminal 1 and the terminal 3 have moved, as long as communication is maintained between the terminal 1 and the terminal 3.

When the line is disconnected between the terminal 1 and the terminal 3, the hard disk drive 31, and the network prefix stored in the hard disk drive 31 are all cleared.

Figure 9:
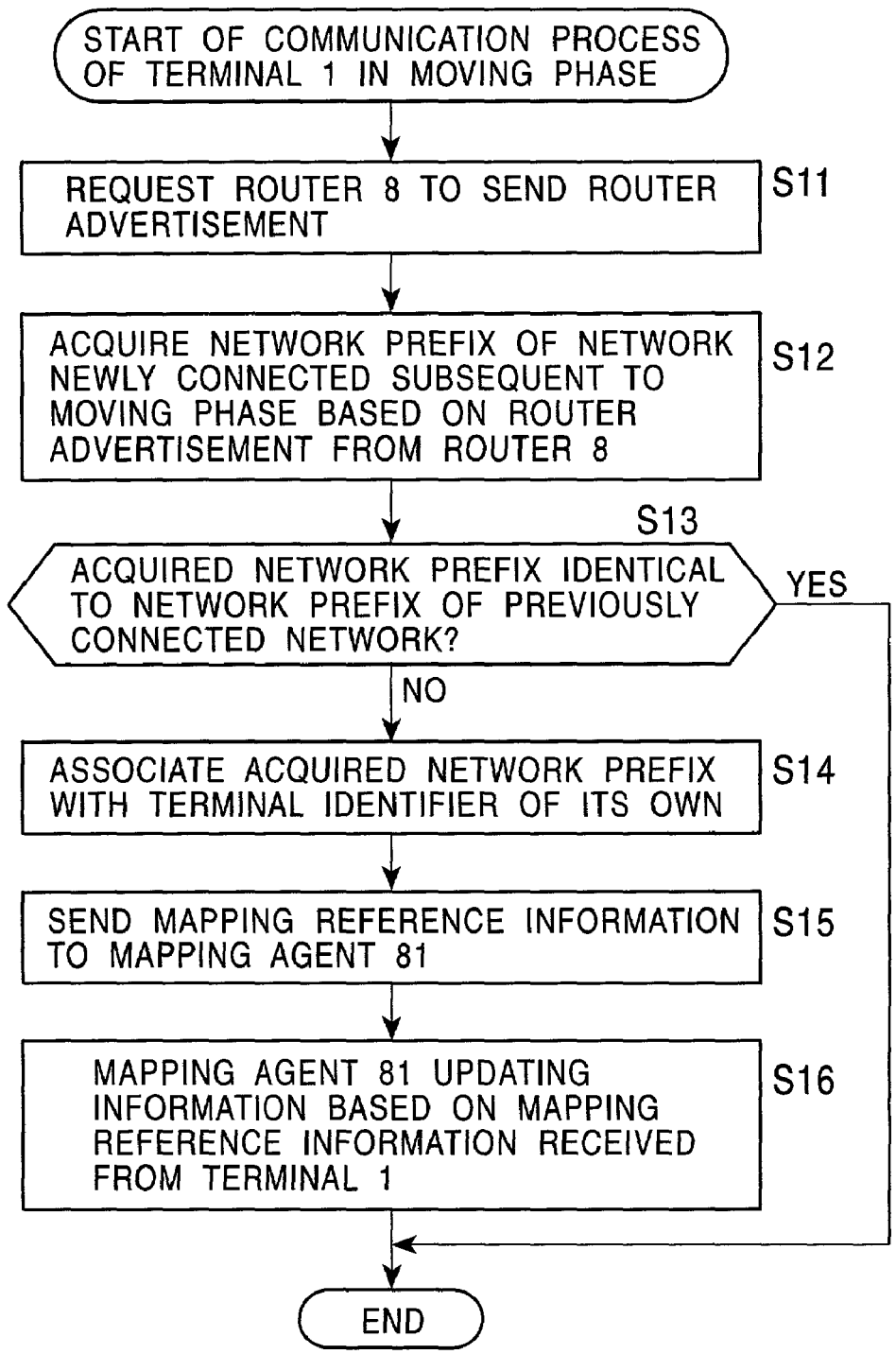
FIG. 9 is a flow diagram illustrating a communication process of the terminal 1 in moving phase.

Referring to a flow diagram shown in FIG. 9, a communication process of the terminal 1 in transit is discussed below.

In step S11, the CPU 21 in the terminal 1 places an enquiry to the router 8 from the radio subnetwork 7 at a destination in a router solicitation, thereby requesting a router advertisement. In step S12, the CPU 21 in the terminal 1 receives the router advertisement supplied by the router 8, and acquires a network prefix of a network newly connected to the terminal 1 subsequent to the movement thereof.

Figure 8:
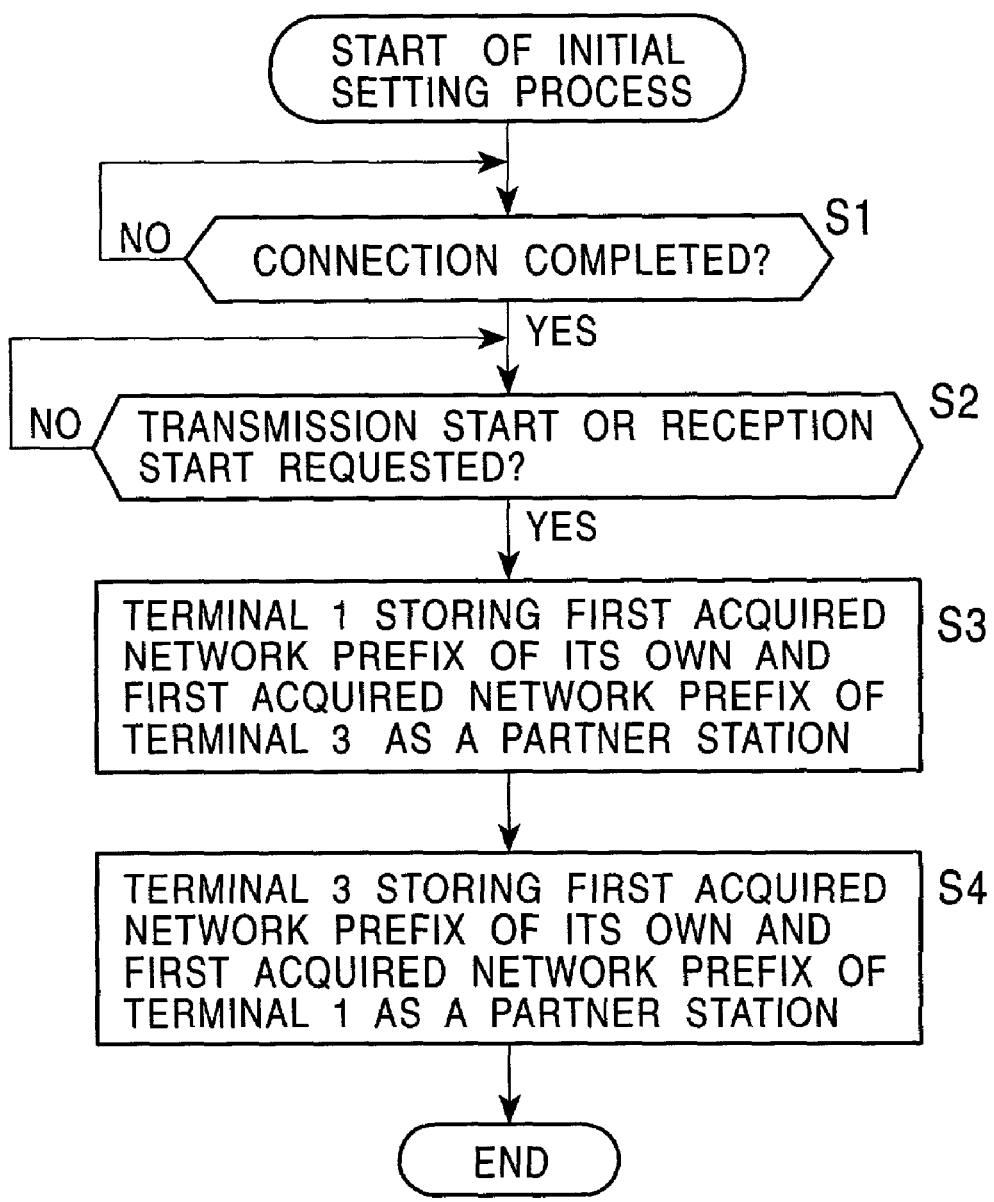
FIG. 8 is a flow diagram illustrating an initial setting process.

In step S13, the CPU 21 in the terminal 1 determines whether the network prefix of the network acquired in step S12 is identical to the first network prefix of the terminal 1 stored in the hard disk drive 31 in the initial setting process shown in FIG. 8.

When it is determined that the network prefix of the network acquired in step S12 is not identical to the first network prefix of the terminal 1 stored in the hard disk drive 31, the process proceeds to step S14. The CPU 21 in the terminal 1 associates the network prefix acquired in step S12 with the terminal identifier of the terminal 1. In this way, mapping reference information of the network prefix of the currently connected network with the terminal identifier of the terminal 1 is thus obtained.

In step S15, the CPU 21 in the terminal 1 generates a binding update packet containing the mapping reference information, and transmits the generated binding update packet to the mapping agent 81. Upon receiving the binding update packet from the terminal 1, the mapping agent 81 detects an SA based on the terminal identifier of the address of the destination and the SPI of the authentication header, and determines a key for authentication and an encryption method, thereby performing an authentication process. When the authentication data is determined to be authentic, the mapping agent 81 updates the binding cache in accordance with the mapping reference information contained in the binding update packet. The current network prefix of the terminal 1 is thus stored in association with the terminal identifier of the terminal 1.

When it is determined in step S13 that the network prefix of the network acquired in step S12 is identical to the first network prefix of the terminal 1 stored in the hard disk drive 31, the process ends with steps S14 through S16 skipped.

Only when the network prefix of the network newly connected subsequent to the moving phase of the terminal 1 is not identical to the first stored network prefix of the terminal 1 as a result of the movement of the terminal 1, information updating is performed. A communication route is thus efficiently established.

When the terminal 3 learns by any means that the terminal 1 as a partner station thereof has moved, the terminal 3 indicates again the terminal identifier of the terminal 1 to the mapping agent 81, thereby enquiring about the current network prefix of the terminal 1. In response, the mapping agent 81 sends the current network prefix of the terminal 1, stored in association with the terminal identifier of the terminal 1, to the terminal 3. In this way, the terminal 3 transfers the current network prefix of the terminal 1 received from the mapping agent 81 to the binding cache for updating. The terminal 3 combines the current network prefix of the terminal 1 with the terminal identifier, thereby generating the IP V6 address. The terminal 3 sets the generated IP V6 address at a destination address of a data packet, and sends the data packet to the terminal 1.

A reception process of the terminal 1 is discussed below referring to a flow diagram shown in FIG. 10.

In step S31, the CPU 21 in the terminal 1 determines whether communication at the application layer has resumed. When the CPU 21 in the terminal 1 determines that communication in the application layer has yet to resume, the CPU 21 waits on standby until communication resumes. When the CPU 21 in the terminal 1 determines that communication has resumed, the process proceeds to step S32 after the terminal 1 has received the data packet from the terminal 3. The CPU 21 in the terminal 1 requests the router 8 to send a router advertisement in a router solicitation.

In step S33, the CPU 21 in the terminal 1 receives the router advertisement from the router 8, and acquires the network prefix of the network to which the terminal 1 is currently connected. In step S34, the CPU 21 in the terminal 1 determines whether the network prefix acquired in step S33 is identical to the first network prefix of the terminal 1 stored in the hard disk drive 31 in the initial setting process shown in FIG. 8.

When it is determined in step S34 that the network prefix acquired in step S33 is not identical to the first network prefix of the terminal 1 stored in the hard disk drive 31, the process proceeds to step S35. After carrying out the communication process during moving phase (shown in FIG. 9), the CPU 21 in the terminal 1 proceeds to step S36.

In step S36, the CPU 21 in the terminal 1 reads the destination address (i.e., the network prefix of the IP V6 address of the terminal 1), namely, the most significant 64 bits of the destination IP address of the packet received from the terminal 3.

In step S37, the CPU 21 in the terminal 1 substitutes the first network prefix of the terminal 1 stored in the hard disk drive 31 for the destination address, namely, the most significant 64 bits of the destination IP address. Specifically, the first network prefix of the terminal 1 is described at the destination address as the most significant 64 bits of the destination IP address.

When it is determined in step S34 that the network prefix acquired in step S33 is identical to the first network prefix of the terminal 1 stored in the hard diskdrive 31, steps S35 through S37 are skipped.

In step S38, the CPU 21 in the terminal 1 reads the source address (i.e., the network prefix of the IP V6 address of the terminal 3), namely, the most significant 64 bits of the source IP address of the received packet. In step S39, the CPU 21 in the terminal 1 determines whether the network prefix, i.e., the most significant 64 bits of the source IP address, read in step S38 are identical to the first network prefix of the terminal 3 stored in the hard disk drive 31 in the initial setting process shown in FIG. 8.

When it is determined in step S39 that the network prefix, i.e., the most significant 64 bits of the source IP address, read in step S38 are not identical to the first network prefix of the terminal 3 stored in the hard disk drive 31, the process proceeds to step S40. The CPU 21 in the terminal 1 substitutes the first network prefix of the terminal 3 stored in the hard disk drive 31 for the source address, i.e., the most significant 64 bits of the source IP address. In other words, the first network prefix of the terminal 3 is described in the source address as the most significant 64 bits of the source IP address.

When the CPU 21 in the terminal 1 determines in step S39 that the network prefix, i.e., the most significant 64 bits of the source IP address, read in step S38 are identical to the first network prefix of the terminal 3 stored in the hard disk drive 31, then, step S40 is skipped.

In step S41, the CPU 21 in the terminal 1 generates a pseudo header as shown in FIG. 11.

In the pseudo header shown in FIG. 11, the first network prefix of the terminal 3 as the source is described in the source address, i.e., the most significant 64 bits of the source IP address, and the terminal identifier of the terminal 3 as the source is described in the least significant 64 bits of the source IP address. The first network prefix of the terminal 1 as the destination is described in the destination address, i.e., the most significant 64 bits of the destination IP address, and the terminal identifier of the terminal 1 as the destination is described in the least significant 64 bits of the destination IP address. Here, the label ZERO simply defines "0," and the label PORT defines a port number designating an application, and the label TCP/UDP LENGTH defines the length of TCP/UDP (i.e., checksum).

In step S42, the CPU 21 in the terminal 1 calculates authentication data in the received packet using the pseudo header (see FIG. 11) generated in step S41. The authentication data is obtained by calculating a hash value of a received packet including a pseudo header. The terminal 1 compares the calculated authentication data with the authentication data contained in an authentication header in the received packet. If both pieces of data match each other, the partner station is determined to be authentic, and the system undergoes the subsequent process. If both pieces of data fail to match each other, the partner station is regarded as unauthentic, and the system forces the process to end.

When the authentication data is checked, in step S43 the CPU 21 in the terminal 1 calculates the checksum of the TCP/UDP using the pseudo header (see FIG. 11), thereby checking the received packet for any error. If any error is contained in the received packet, the received packet is discarded. If no error is contained in the received packet, the received packet is discarded. If no error is found, the received packet is captured.

In step S44, the CPU 21 in the terminal 1 determines whether the communication at the application layer has been completed. When it is determined that the communication has not been completed yet, the process returns to step S32, thereby starting over therefrom. When it is determined in step S44 that the communication has been completed, the process ends.

In this way, movement transparency of the IPsec layer and the transport layer (TCP/UDP) is maintained during the reception of the data packet without the need for a particular modification in the upper layers of the IP layers.

A transmission process of the terminal 1 is discussed below referring to a flow diagram shown in FIG. 12.

In step S61, the CPU 21 in the terminal 1 determines whether communication is resumed at the application layer. When it is determined that communication is not resumed at the application layer, the CPU 21 in the terminal 1 waits on standby until communication is resumed. When the communication is resumed, the process proceeds to step S62. The CPU 21 in the terminal 1 places an enquiry to the router 8 in a router solicitation, thereby requesting the router 8 to send a router advertisement. The terminal 1 receives the router advertisement supplied from the router 8, and acquires a network prefix of a network to which the terminal 1 itself is currently connected.

In step S63, the CPU 21 in the terminal 1 determines whether the network prefix acquired in step S62 is identical to the first network prefix of the terminal 1 stored in the hard disk drive 31 in the initial setting process shown in FIG. 8.

When it is determined in step S63 that the network prefix acquired in step S62 is not identical to the first network prefix of the terminal 1 stored in the hard disk drive 31, the process proceeds to step S64. The process then proceeds to step S65 after the CPU 21 in the terminal 1 performs the communication process in moving phase (see FIG. 9) in step S64.

In step S65, the CPU 21 in the terminal 1 substitutes the first network prefix of the terminal 1 for the source address as the most significant 64 bits of the source IP address of the transmission packet. In other words, the first network prefix of the terminal 1 is described in the source address as the most significant 64 bits of the source IP address of the transmission packet.

When it is determined in step S63 that the network prefix acquired in step S62 is identical to the first network prefix of the terminal 1 stored in the hard disk drive 31, steps S64 and S65 are skipped.

In step S66, the CPU 21 in the terminal 1 acquires the current network prefix of the terminal 3.

Specifically, the terminal 1 places an enquiry about terminal identifier of the terminal 3 and the IP V6 address of a mapping agent (not shown) associated with the terminal 3 by indicating to the domain name server 4 the host name of the terminal 3. In response to the host name, the domain name server 4 reads and then transmits the terminal identifier of the terminal 3 and the IP V6 address of the mapping agent associated with the terminal 3 to the terminal 1. The terminal 1 places an enquiry about the current network prefix of the terminal 3 to the mapping agent by indicating the terminal identifier of the terminal 3 based on the IP V6 address of the mapping agent received from the domain name server 4. In response to the terminal identifier of the terminal 3, the mapping agent transmits the current network prefix of the terminal 3. In this way, the current network prefix of the terminal 3 is obtained.

In step S67, the terminal 1 determines whether the network prefix acquired in step S66 is identical to the first network prefix of the terminal 3 stored in the hard disk drive 31 in the initial setting process shown in FIG. 8.

When it is determined in step S67 that the network prefix acquired in step S66 is not identical to the first network prefix of the terminal 3 stored in the hard disk drive 31, the process proceeds to step S68. The CPU 21 in the terminal 1 substitutes the first network prefix of the terminal 3 for the destination address, i.e., the most significant 64 bits of the destination IP address of the transmission packet. In other words, the first network prefix of the terminal 3 is described in the destination address, i.e., the most significant 64 bits of the destination IP address.

When the CPU 21 in the terminal 1 determines in step S67 that the network prefix acquired in step S66 is identical to the first network prefix of the terminal 3 stored in the hard disk drive 31, step S68 is skipped.

In step S69, the CPU 21 in the terminal 1 sets the first network prefix of the terminal 1 at the source address, i.e., the most significant 64 bits of the source IP address, while setting the first network prefix of the terminal 3 at the destination address, i.e., the most significant 64 bits of the source IP address. The pseudo header (see FIG. 1) is thus produced. Based on the pseudo header, the CPU 21 in the terminal 1 calculates the authentication header, and organizes the calculated authentication header in a transmission packet.

In step S70, the CPU 21 in the terminal 1 calculates the checksum of the TCP/UDP using the generated pseudo header (see FIG. 11). Results of calculation (TCP/UDP LENGTH) is organized in the transmission packet.

In step S71, the CPU 21 in the terminal 1 sets the current (latest) network prefix of the terminal 3 acquired in step S66 at the most significant 64 bits of the destination IP address of the transmission packet. In step S72, the terminal 1 sets the network prefix of the (latest) network connected thereto and acquired in step S62 at the most significant 64 bits of the source IP address of the transmission packet.

In step S73, the CPU 21 in the terminal 1 sets the latest network prefix of the terminal 3 at the destination IP address, sets the latest network prefix of the terminal 1 at the source IP address, and sends to the terminal 3 the transmission packet in which the authentication data and the checksum of the TCP/UDP calculated based on the first network prefix of the terminal 1 and the first network prefix of the terminal 3 are organized.

In step S74, the CPU 21 in the terminal 1 determines whether the communication at the application layer has been completed. When it is determined that the communication at the application layer has not been completed yet, the process returns to step S62, thereby starting over therefrom. When it is determined in step S74 that the communication at the application layer has been completed, the process ends.

In this way, movement transparency of the IPsec layer and the transport layer (TCP/UDP) is maintained during the transmission of the data packet without the need for a particular modification in the upper layers of the IP layers.

Without any modification introduced in an existing protocol, movement transparency is assured not only in IP routing but also in IPsec and TCP/IP sessions performed at a layer higher than that for the IP routing.

This arrangement eliminates the need for defining a network prefix dedicated to a session, such as using a fixed value or private value, and movement transparency is assured at the upper layer such as the TCP/UDP.

It is determined whether the network prefix is updated, and only when the network prefix is updated, the authentication data and the checksum are calculated. This arrangement avoids meaningless address rewriting.

When the terminal 3 learns by any means that the terminal 1 as a partner station thereof has moved, the terminal 3 enquires again about the network prefix of the terminal 1 to the mapping agent 81. The terminal 3 may place the enquiry at a regular basis regardless of whether or not the terminal 1 has moved.

Figure 10:
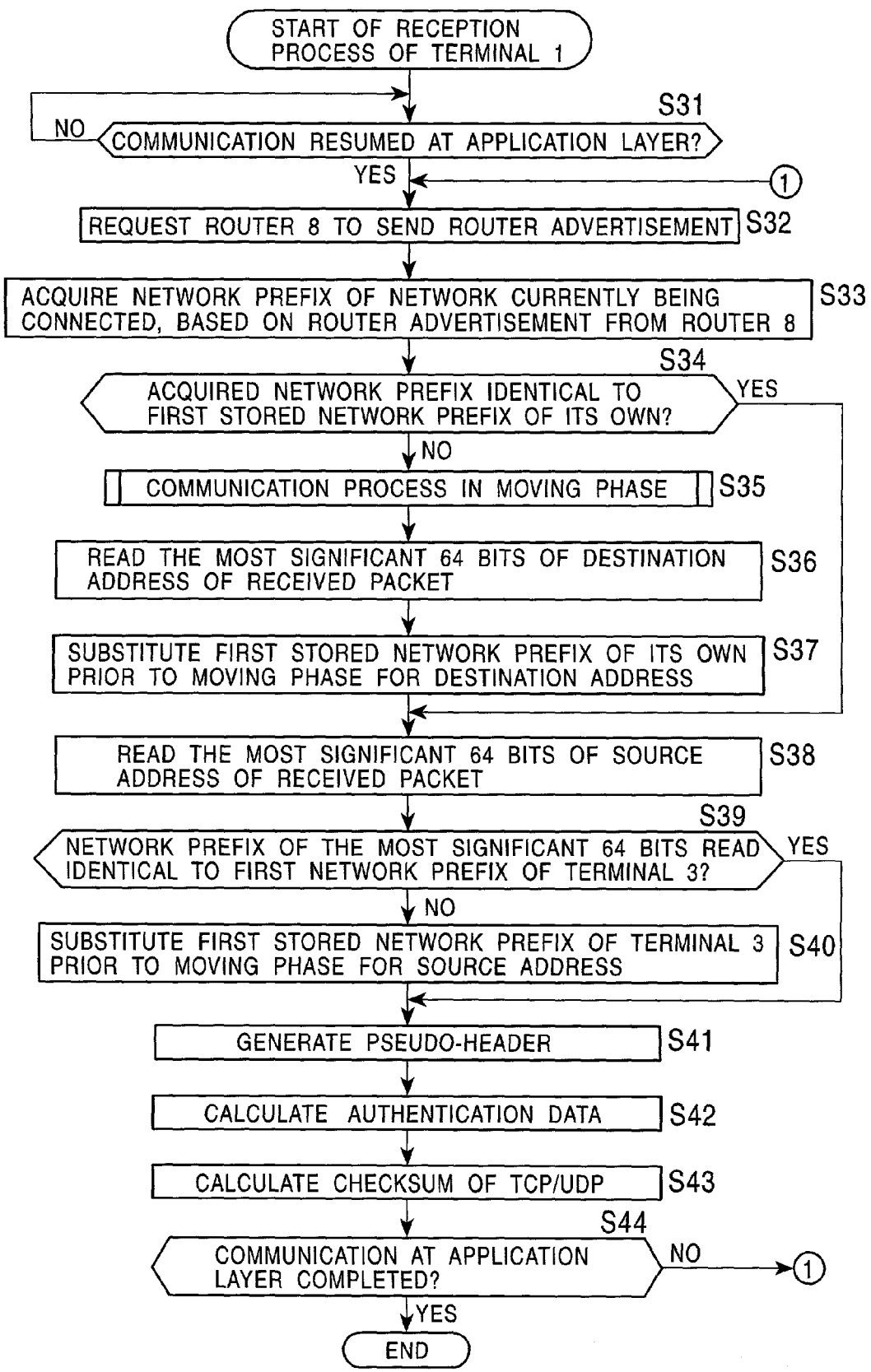
FIG. 10 is a flow diagram illustrating a reception process of the terminal 1.
Figure 12:
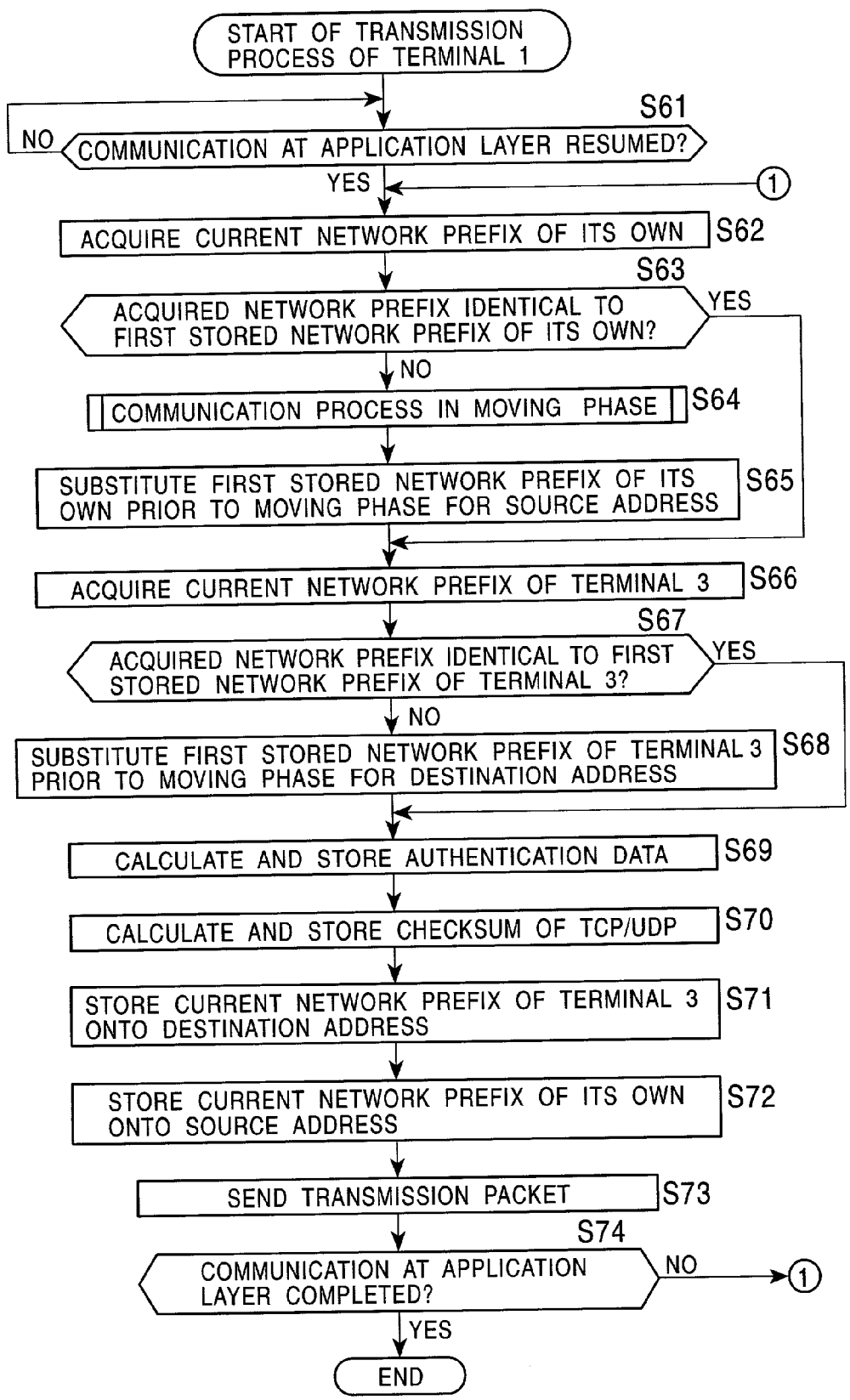
FIG. 12 is a flow diagram illustrating a transmission process of the terminal 1.

In the processes shown in FIG. 10 and 12, the subsequent process is performed depending on whether the communication at the application layer has been resumed. The present invention is not limited to this arrangement. Upon key exchange performed between the terminal 1 and the terminal 3 through the SA, the subsequent process may follow thereafter.

In the initial setting process shown in FIG. 8, the network prefixes of the terminal 1 and the terminal 3 are stored in the hard disk drive 31. When one of the terminal 1 and the terminal 3 has moved, or when an application starts up on a different terminal at a destination of the movement of the user, network prefixes (source address and destination address) first designated by the application may be stored together with port numbers (a source port number and a destination port number) designating the application.

The above-referenced series of process steps may be executed using a software program. The software program is installed in a computer built in dedicated hardware. The software program may be installed from a storage medium in a general-purpose computer that executes a variety of functions with various software programs installed therewithin.

The storage medium includes a package medium which stores a software program and is distributed to supply the user with the software program, separate from a computer, as shown in FIGS. 4 and 5. The package medium may be the magnetic disk 41, the magnetic disk 61 (such as a floppy disk), the optical disk 42 (such as a CD-ROM (Compact-Disk Read-Only Memory), DVD (Digital Versatile Disk)), the magneto-optical disk 43, the magneto-optical disk 63 (such as MD (Mini-Disk)), the semiconductor memory 44, or the semiconductor memory 64.

In this invention, the process steps describing the software program stored in the storage medium are sequentially carried in the order as described. Alternatively, the process steps may be performed with several steps in parallel at a time or separately.

In the specification, the system includes a plurality of apparatuses.

In accordance with the first through fourth aspects of the present invention, the first position information representing the initial position of the information processing apparatus, and the second position information representing the initial position of the partner information processing apparatus are stored when communication is established with the partner information processing apparatus. The data is received from the partner information processing apparatus. The third position information representing the current position of the information processing apparatus is acquired. It is determined whether the third acquired position information corresponds to the first position information. The received data is then authenticated based on the received data. In this way, movement transparency of the IPsec layer and the transport layer is assured during the reception of the data packet without the need for a particular modification in the existing protocol.

In accordance with the fifth through eighth aspects of the present invention, the first position information representing the initial position of the information processing apparatus, and the second position information representing the initial position of the partner information processing apparatus are stored when communication is established with the partner information processing apparatus. The third position information representing the current position of the information processing apparatus is acquired. It is determined whether the third acquired position information corresponds to the first position information. The fourth position information representing the current position of the partner information processing apparatus is acquired. It is determined whether the fourth acquired position information corresponds to the second position information. Data is then transmitted to the partner information processing apparatus, based on results of determination. In this way, movement transparency of the IPsec layer and the transport layer is assured during the transmission of the data packet without the need for a particular modification in the existing protocol.

What is claimed is:

1. An information processing apparatus for processing information, connected to another information processing apparatus through a network, comprising:
   a storage unit for storing first position information representing an initial position of said information processing apparatus, and second position information representing an initial position of said another information processing apparatus when communication is established with said another information processing apparatus;
   a receiver unit for receiving data from said another information processing apparatus;
   an acquisition unit for acquiring third position information representing a current position of said information processing apparatus;
   a first determining unit for determining whether the third position information acquired by said acquisition unit corresponds to the first position information stored in said storage unit; and
   an authenticator unit for authenticating the data received by said receiver unit, based on the determination of the first position information provided by said first determining unit.

2. An apparatus according to claim 1, further comprising:
   a reader unit for reading fourth position information of said information processing apparatus, forming a destination address, and fifth position information of said another information processing apparatus, forming a source address, contained in the data received by the said receiver unit, when the result of determination provided by said first determining unit indicates that the third position information fails to correspond to the first position information; and
   a second determining unit for determining whether the fifth position information read by said reader unit corresponds to the second position information stored in said storage unit.

3. An apparatus according to claim 2, further comprising a substituting unit for substituting the first position information for the fourth position information when the result of determination provided by said first determining unit indicates that the third position information fails to correspond to the first position information.

4. An apparatus according to claim 2, further comprising a substituting unit for substituting the second position information for the fifth position information when the result of determination provided by said second determining unit indicates that the fifth position information fails to correspond to the second position information.

5. An apparatus according to claim 2, wherein the fourth position information is assigned to a portion of the most significant bits of the destination address.

6. An apparatus according to claim 2, wherein the fifth position information is assigned to a portion of the most significant bits of the source address.

7. An apparatus according to claim 1, wherein said authenticator unit uses the first and second position information to authenticate the data received by said receiver unit.

8. An apparatus according to claim 1, further comprising a notifying unit for notifying an information storage device connected to said network of the fourth position information representing the current position of said information processing apparatus, and identification information identifying said information processing apparatus, when said information processing apparatus is connected to another network.

9. An apparatus according to claim 8, wherein said identification information is a terminal identifier identifying said information processing apparatus over said network.

10. An apparatus according to claim 1, further comprising a reset unit for resetting the first and second position information stored in said storage unit when communication with said another information processing apparatus is disconnected.

11. A method for processing information, for an information processing apparatus that is connected to another information processing apparatus through a network, said method comprising:
   a step of controlling storage of first position information representing an initial position of said information processing apparatus, and of second position information representing an initial position of said another information processing apparatus when communication is established with said another information processing apparatus;
   a step of receiving data from said another information processing apparatus;
   a step of acquiring third position information representing a current position of said information processing apparatus;
   a step of determining whether the third position information acquired in said acquisition step corresponds to the first position information, storage of which is controlled in said controlling step; and
   a step of authenticating the data received in said receiving step, based on the determination of the first position information provided in said determining step said information processing apparatus using the authentication result to ensure proper data transfer during its movement.

12. A computer-readable medium storing a software program for controlling an information processing apparatus that is connected to another information processing apparatus through a network, said software program comprising program codes for:
   a step of controlling storage of first position information representing an initial position of said information processing apparatus, and of second position information representing an initial position of said another information processing apparatus when communication is established with said another information processing apparatus;
   a step of receiving data from said another information processing apparatus;
   a step of acquiring third position information representing a current position of said information processing apparatus;
   a step of determining whether the third position information acquired in said acquisition step corresponds to the first position information, storage of which is controlled in said controlling step; and
   a step of authenticating the data received in said receiving step, based on the determination of the first position information provided in said determining step.

13. An apparatus for processing information, connected to another information processing apparatus through a network, comprising:
   a storage unit for storing first position information representing an initial position of said information processing apparatus, and second position information representing an initial position of said another information processing apparatus when communication is established with said another information processing apparatus;
   a first acquisition unit for acquiring third position information representing a current position of said information processing apparatus;
   a first determining unit for determining whether the third position information acquired by said first acquisition unit corresponds to the first position information stored in said storage unit;
   a second acquisition unit for acquiring fourth position information representing a current position of said another information processing apparatus;
   a second determining unit for determining whether the fourth position information acquired by said second acquisition unit corresponds to the second position information stored in said storage unit; and
   a transmitter unit for transmitting data to said another information processing apparatus, based on the determination of the first position information provided by said first and second determining unit.

14. An apparatus according to claim 13, further comprising a substituting unit for substituting the first position information for the third position information when the result of determination provided by said first determining unit indicates that the third position information fails to correspond to the first position information.

15. An apparatus according to claim 13, further comprising a substituting unit for substituting the second position information for the fourth position information when the result of determination provided by said second determining unit indicates that the fourth position information fails to correspond to the second position information.

16. An apparatus according to claim 13, further comprising:
   a calculating unit for calculating additional information, to be added to the data, from the first and second position information stored in said storage unit; and
   an adding unit for adding said additional information calculated by said calculating unit to the data,
   wherein said transmitter unit sets, at a source address, the third position information acquired by said first acquisition unit, sets, at a destination address, the fourth position information acquired by said second acquisition unit, and transmits the data to which the additional data has been added by said adding unit.

17. An apparatus according to claim 16, wherein the third position information is assigned to a portion of the most significant bits of the destination address.

18. An apparatus according to claim 16, wherein the fourth position information is assigned to a portion of the most significant bits of the source address.

19. An apparatus according to claim 13, further comprising a notifying unit for notifying an information storage device connected to said network of the fifth position information representing the current position of said information processing apparatus, and identification information identifying said information processing apparatus, when said information processing apparatus is connected to another network.

20. An apparatus according to claim 19, wherein said identification information is a terminal identifier identifying said information processing apparatus over said network.

21. An apparatus according to claim 13, further comprising a reset unit for resetting the first and second position information stored in said storage unit when communication with said another information processing apparatus is disconnected.

22. A method for processing information, for an information processing apparatus connected to another information processing apparatus through a network, said method comprising:
   a step of controlling storage of first position information representing an initial position of said information processing apparatus, and of second position information representing an initial position of said another information processing apparatus when communication is established with said another information processing apparatus;
   a first acquisition step of acquiring third position information representing a current position of said information processing apparatus;
   a first determining step of determining whether the third position information acquired in said first acquisition step corresponds to the first position information, storage of which is controlled in said controlling step;
   a second acquisition step of acquiring fourth position information representing a current position of said another information processing apparatus;
   a second determining step of determining whether the fourth position information acquired in said second acquisition step corresponds to the second position information, storage of which is controlled in said controlling step; and
   a transmitting step of transmitting data to said another information processing apparatus, based on results of determination provided in said first and second determining steps said information processing apparatus using the determination result to ensure proper data transfer during its movement.

23. A computer-readable medium storing a software program for controlling an information processing apparatus connected to another information processing apparatus through a network, said computer-readable software program comprising program codes for:
- a step of controlling storage of first position information representing an initial position of said information processing apparatus, and of second position information representing an initial position of said another information processing apparatus when communication is established with said another information processing apparatus;
- a first acquisition step of acquiring third position information representing a current position of said information processing apparatus;
- a first determining step of determining whether the third position information acquired in said first acquisition step corresponds to the first position information, storage of which is controlled in said controlling step;
- a second acquisition step of acquiring fourth position information representing a current position of said another information processing apparatus;
- a second determining step of determining whether the fourth position information acquired in said second acquisition step corresponds to the second position information, storage of which is controlled in said controlling step; and
- a transmitting step of transmitting data to said another information processing apparatus, based on the determination of the first position information and the second position information determination provided in said first and second determining steps, respectively.

* * * * *